(12) United States Patent
Kobayashi et al.

(10) Patent No.: US 8,958,199 B2
(45) Date of Patent: Feb. 17, 2015

(54) STORAGE BODY AND STORAGE DEVICE

(75) Inventors: Shigemi Kobayashi, Saitama (JP); Shuuichi Araki, Saitama (JP)

(73) Assignee: UD Trucks Corporation, Saitama (JP)

( * ) Notice: Subject to any disclaimer, the term of this patent is extended or adjusted under 35 U.S.C. 154(b) by 165 days.

(21) Appl. No.: 13/133,218

(22) PCT Filed: Dec. 15, 2009

(86) PCT No.: PCT/JP2009/071191
§ 371 (c)(1), (2), (4) Date: Jun. 7, 2011

(87) PCT Pub. No.: WO2010/074009
PCT Pub. Date: Jul. 1, 2010

(65) Prior Publication Data
US 2011/0242732 A1 Oct. 6, 2011

(30) Foreign Application Priority Data

Dec. 26, 2008 (JP) ................................. 2008-332797

(51) Int. Cl.
| | |
|---|---|
| *H01G 2/10* | (2006.01) |
| *H01G 9/08* | (2006.01) |
| *H01G 9/04* | (2006.01) |
| *H01G 9/008* | (2006.01) |
| *H01G 9/00* | (2006.01) |
| *H01G 11/12* | (2013.01) |
| *H01G 11/72* | (2013.01) |
| *H01G 11/74* | (2013.01) |

(Continued)

(52) U.S. Cl.
CPC ............... *H01G 9/058* (2013.01); *H01G 9/016* (2013.01); *H01G 9/155* (2013.01); *H01G 11/12* (2013.01); *H01G 11/72* (2013.01); *H01G 11/74* (2013.01); *H01G 11/82* (2013.01); *H01G 11/84* (2013.01); *H01M 2/0237* (2013.01); *H01M 2/1072* (2013.01); *H01G 11/32* (2013.01); *H01G 11/80* (2013.01); *Y02E 60/13* (2013.01); *Y02T 10/7022* (2013.01)
USPC ........................... 361/517; 361/502; 361/535

(58) Field of Classification Search
USPC ......... 361/502, 517, 519, 522, 523, 535, 537, 361/538
See application file for complete search history.

(56) References Cited

U.S. PATENT DOCUMENTS

| | | | | |
|---|---|---|---|---|
| 4,803,597 | A * | 2/1989 | Watanabe et al. | ............. 361/502 |
| 6,743,546 | B1 | 6/2004 | Kaneda et al. | |

(Continued)

FOREIGN PATENT DOCUMENTS

| | | |
|---|---|---|
| CN | 1560956 A | 1/2005 |
| JP | 2002-028485 | 1/2002 |

(Continued)

*Primary Examiner* — Dion R Ferguson
(74) *Attorney, Agent, or Firm* — Rabin & Berdo, P.C.

(57) ABSTRACT

A storage body comprises an electric energy storage unit and a case that houses the storage unit. The case comprises a frame-shaped outer shell body having two end surfaces that respectively include opening portions and a pair of laminate film pieces that are adhered to the respective end surfaces of the outer shell body so as to form a storage chamber inside the outer shell body. Each laminate film piece comprises an adhesion portion that is adhered to the outer shell body and a film portion that faces the storage chamber. The laminate film pieces, which are not formed by press-molding, are adhered to the outer shell body, and therefore structurally weak sites are not formed on the laminate film pieces.

15 Claims, 12 Drawing Sheets

(51) Int. Cl.
*H01G 11/82* (2013.01)
*H01G 11/84* (2013.01)
*H01M 2/02* (2006.01)
*H01M 2/10* (2006.01)
*H01G 11/32* (2013.01)
*H01G 11/80* (2013.01)

(56) References Cited

U.S. PATENT DOCUMENTS

| | | | |
|---|---|---|---|
| 7,597,992 B2 * | 10/2009 | Kanai et al. | 429/53 |
| 2002/0006546 A1 * | 1/2002 | Sakata et al. | 429/185 |
| 2005/0147880 A1 * | 7/2005 | Takahashi et al. | 429/177 |
| 2006/0216586 A1 * | 9/2006 | Tucholski | 429/162 |

FOREIGN PATENT DOCUMENTS

| | | | | |
|---|---|---|---|---|
| JP | 2002-289485 | 10/2002 | | |
| JP | 2003-068257 | 3/2003 | | |
| JP | 2003-075964 | 3/2003 | | |
| JP | 2003-272968 | 9/2003 | | |
| JP | 2003272967 | 9/2003 | | |
| JP | 2005-268004 | 9/2005 | | |
| JP | 2008-124089 | 5/2008 | | |
| JP | 2008-153282 | 7/2008 | | |
| JP | 2008-300593 | 12/2008 | | |
| WO | WO-00/59063 | 10/2000 | | |
| WO | WO 2005/096412 | * | 10/2005 | H01M 2/02 |

* cited by examiner

STORAGE BODY AND STORAGE DEVICE

FIELD OF THE INVENTION

This invention relates to a case employing laminate film, which is used for a storage unit constituted by an electric double layer capacitor cell or various types of accumulators.

BACKGROUND OF THE INVENTION

The following documents published by the Japan Patent Office disclose a case formed from laminate film for housing a storage unit of a storage body constituted by an electric double layer capacitor cell or various types of accumulators.
JP2003-272967 A (U.S. Pat. No. 3,848,189)
JP2008-153282 A (U.S. Pat. No. 3,986,545)
JP2005-268004 A
JP2003-068257 A
JP2002-289485 A Of these documents, JP2003-272967 A proposes a case for an electric double layer capacitor cell in which two laminate film pieces press-molded three-dimensionally are joined into a bag shape.

The two laminate film pieces are joined by adhesion. A storage unit housed in the case is constituted by a laminated body formed from a positive electrode body, a negative electrode body, and a separator, and an electrolyte that wets the laminated body.

The prior art further proposes a capacitor module serving as a storage device, which is constituted by a laminated cell formed by laminating together electric double layer capacitor cells created using the case, and a pressing mechanism that applies a predetermined surface pressure to the laminated cell in a lamination direction.

SUMMARY OF THE INVENTION

In the case proposed in the prior art, the pressure of a gas generated during charging and discharging of the storage unit acts on the laminate film pieces.

The laminate film pieces are molded three-dimensionally by pressing, and therefore variation in thickness and density or residual stress occurring during the three-dimensional molding process may produce sites low in strength. When a capacitor cell for installation in a vehicle is formed from an electric double layer capacitor cell having a case that uses these laminate film pieces, a load generated by vibration of the vehicle may concentrate in a site of the case that is low in strength, and as a result, a durability of the case may be impaired.

It is therefore an object of this invention to improve the durability of a case employing laminate film pieces, which is used in a storage body constituted by an electric double layer capacitor cell or various types of accumulators. A further object of this invention is to improve the durability of the storage body using this case and a storage device formed by laminating a plurality of the storage bodies.

In order to achieve the above objects, a storage body according to this invention comprises a storage unit that stores electric energy and a case that houses the storage unit. The case comprises a frame-shaped outer shell body having two end surfaces that respectively include opening portions and a pair of laminate film pieces that are adhered to the respective end surfaces of the outer shell body so as to form a storage chamber inside the outer shell body. Each laminate film piece comprises an adhesion portion that is adhered to the outer shell body and a film portion that faces the storage chamber.

A storage device according to this invention is obtained by laminating a plurality of the storage bodies constituted as described above.

The details as well as other features and advantages of this invention are set forth in the remainder of the specification and are shown in the accompanying drawings.

DESCRIPTION OF THE PREFERRED EMBODIMENTS

Figure 1C:
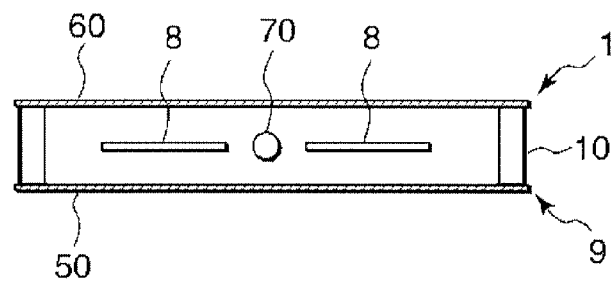
FIGS. 1A-1C are an elevation view, a longitudinal sectional view, and a plan view of an electric double layer capacitor cell according to this invention.
Figure 1A:
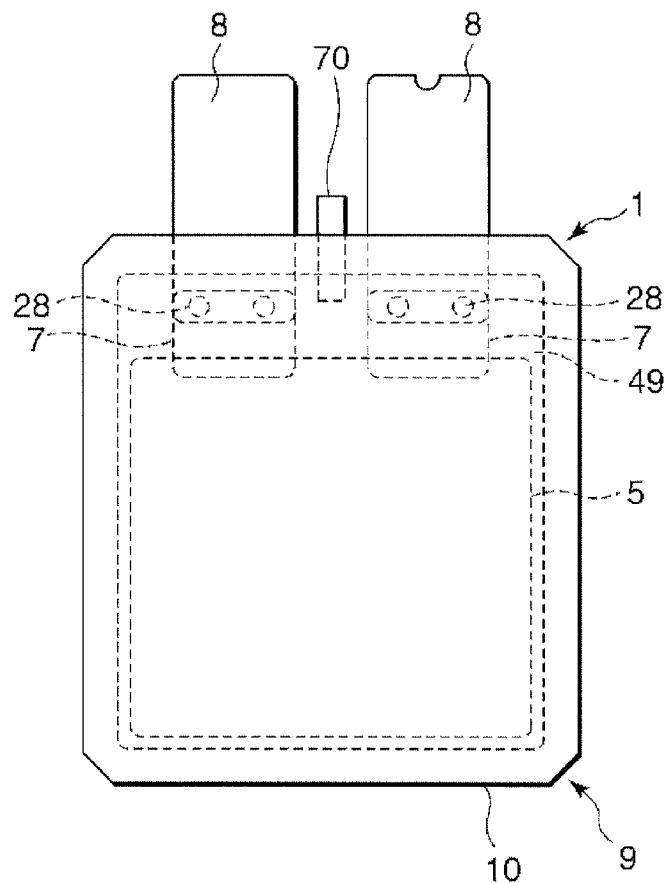
Figure 1B:
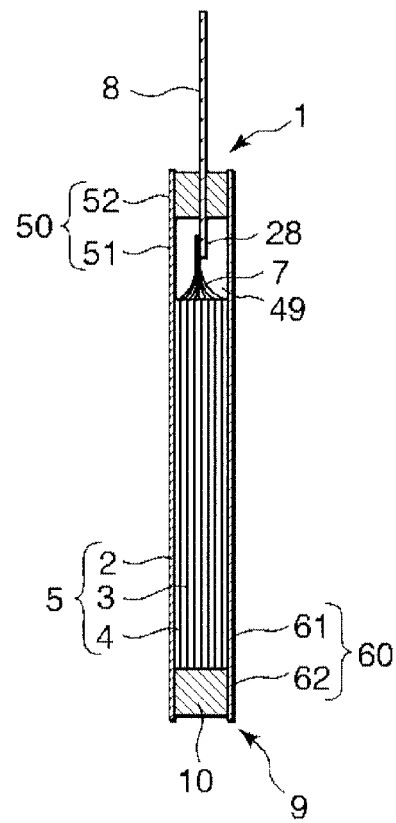

Referring to FIGS. 1A-1C of the drawings, an electric double layer capacitor cell 1 serving as a storage body includes a storage unit that stores an electric charge and a case 9 that houses the storage unit.

The storage unit is constituted by a laminated body 5 formed by laminating a plurality of positive electrode bodies 2 and negative electrode bodies 3 alternately in a single direction via separators 4, and an electrolyte that wets the laminated body 5. The storage unit is a so-called electric double layer capacitor that stores electric energy in accordance with a capacitance of an electric double layer formed in both the positive electrode body 2 and the negative electrode body 3, and discharges the stored electric energy.

The separators 4 are formed from a non-conductive material such as a paper or resin sheet, and are interposed between adjacent positive and negative electrode bodies 2 and 3.

The positive electrode body 2 and the negative electrode body 3 are constituted by polarized electrodes forming an electric double layer on a surface thereof. Collector electrodes 7 are connected to the polarized electrodes.

The polarized electrodes are constituted by activated carbon formed into a rectangular plate shape. By employing activated carbon having an extremely large specific surface area as the polarized electrodes, the capacitance of the electric double layer capacitor can be increased.

The collector electrodes 7 are constituted by strip-form metallic foil, for example aluminum foil.

By binding homopolar collector electrodes 7 together and joining the bound collector electrodes 7 to an electrode terminal 8 having a corresponding polarity by welding, for example, a joint portion 28 is provided. The electrode terminal 8 is constituted by a strip-form metallic plate, for example an aluminum plate.

The electrode terminal 8 is exposed to the outside of the case 9 and connected to an input/output circuit. Charging and discharging is performed on the capacitor cell 1 via the electrode terminal 8.

The capacitor cell 1 includes a pressure purge valve 70 that purges an internal pressure of the case 9 to the outside. The pressure purge valve 70 opens when the internal pressure of the case 9 rises to or above a predetermined value such that gas inside the case 9 is discharged to the outside.

The case 9 is constituted by a resin frame-shaped outer shell body 10 surrounding the laminated body 5, and laminate film pieces 50 and 60 adhered to the outer shell body 10. The outer shell body 10 includes end surfaces 15 and 16 that form opening portions in a lamination direction. By adhering the laminate film pieces 50 and 60 to the outer shell body 10, the opening portions formed by the end surfaces 15 and 16 are closed. A storage chamber 49 housing the laminated body 5 is defined on the inside of the outer shell body 10 to which the laminate film pieces 50 and 60 are adhered.

Figure 2A:
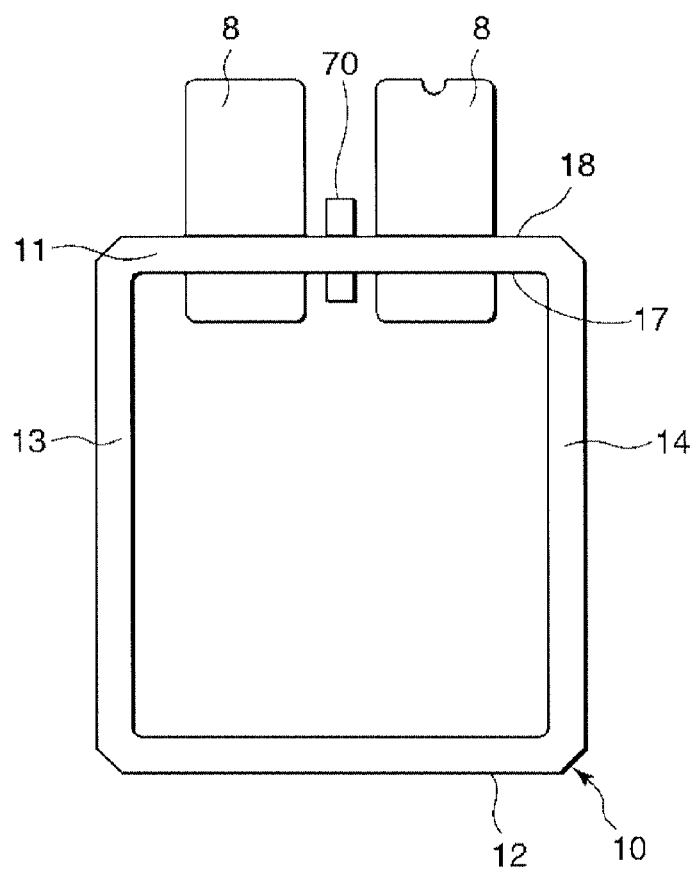
FIGS. 2A and 2B are an elevation view and a longitudinal sectional view of an outer shell body according to this invention.
Figure 2B:
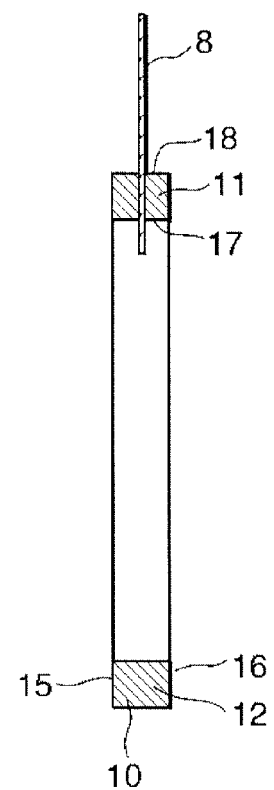

Referring to FIGS. 2A and 2B, the outer shell body 10 is formed by molding an upper side portion 11 and a lower side portion 12 extending in a substantially horizontal direction and a right side portion 13 and a left side portion 14 extending in a substantially vertical direction integrally using resin to obtain a rectangular frame shape that surrounds the laminated body 5.

With this structure, the outer shell body 10 possesses sufficient rigidity to form an outer shell of the case 9, and the outer shell body 10 therefore functions to maintain the shape of the case 9.

The outer shell body 10 is formed in a shape that conforms to an outer shape of the positive electrode body 2 and negative electrode body 3. When the positive electrode body 2 and negative electrode body 3 are circular, for example, the outer shell body 10 is also formed in a circular frame shape to conform to the outer shape of the electrodes.

The outer shell body 10 includes the end surfaces 15 and 16 with respect to the lamination direction, an inner peripheral surface 17, and an outer peripheral surface 18.

The end surfaces 15 and 16 form a substantially orthogonal plane to the lamination direction of the laminated body 5. This plane is substantially parallel to a front surface of the positive electrode body 2 and negative electrode body 3, which serves as a lamination surface of the laminated body 5.

The inner peripheral surface 17 and the outer peripheral surface 18 form a parallel plane to the lamination direction of the laminated body 5. This plane is substantially orthogonal to the lamination surface of the laminated body 5.

The electrode terminal 8 and the pressure purge valve 70 project to the outside of the outer shell body 10 through the upper side portion 11. The outer shell body 10 is insert-molded in a following process such that the electrode terminal 8 and the pressure purge valve 70 are disposed in advance.

The electrode terminal 8 and the pressure purge valve 70 are loaded into a die of the outer shell body 10, whereupon molten resin is injected into the die. The injected molten resin hardens so as to envelop the electrode terminal 8 and the pressure purge valve 70. As a result, the outer shell body 10 contacts the electrode terminal 8 and the pressure purge valve 70 closely without gaps, and thus a favorable sealing performance is secured in the outer shell body 10 on the periphery of the electrode terminal 8 and the pressure purge valve 70.

After molding the outer shell body 10 in this manner, the collector electrodes 7 are welded to the electrode terminal 8 in a following process.

The laminated body 5 is disposed inside the outer shell body 10 and the collector electrodes 7 are overlapped with an end portion of the electrode terminal 8 projecting into the outer shell body 10. In this state, the joint portion 28 is formed by welding the end portion of the electrode terminal 8 to the collector electrodes 7 by spot welding, laser welding, or the like.

After welding the electrode terminal 8 to the collector electrodes 7, the laminate film pieces 50 and 60 are adhered to the outer shell body 10 to form the case 9.

The laminate film pieces 50 and 60 are constituted by flexible laminated sheets having an intermediate layer formed from metallic foil such as aluminum foil, for example, and resin surface layers sandwiching the intermediate layer. The laminate film piece 50 includes a film portion 51 facing the storage chamber 49 and an adhesion portion 52 positioned on the outside of the film portion 51 and adhered to the upper side portion 11, lower side portion 12, right side portion 13, and left side portion 14 of the outer shell body 10. The laminate film piece 60 includes a film portion 61 facing the storage chamber 49 and an adhesion portion 62 positioned on the outside of the film portion 61 and adhered to the upper side portion 11, lower side portion 12, right side portion 13, and left side portion 14 of the outer shell body 10.

A laminate film adhesion process and an electrolyte charging process, which are performed during assembly of the capacitor cell 1, will be described next.

(1) Laminate Film Adhesion Process

Figure 3:
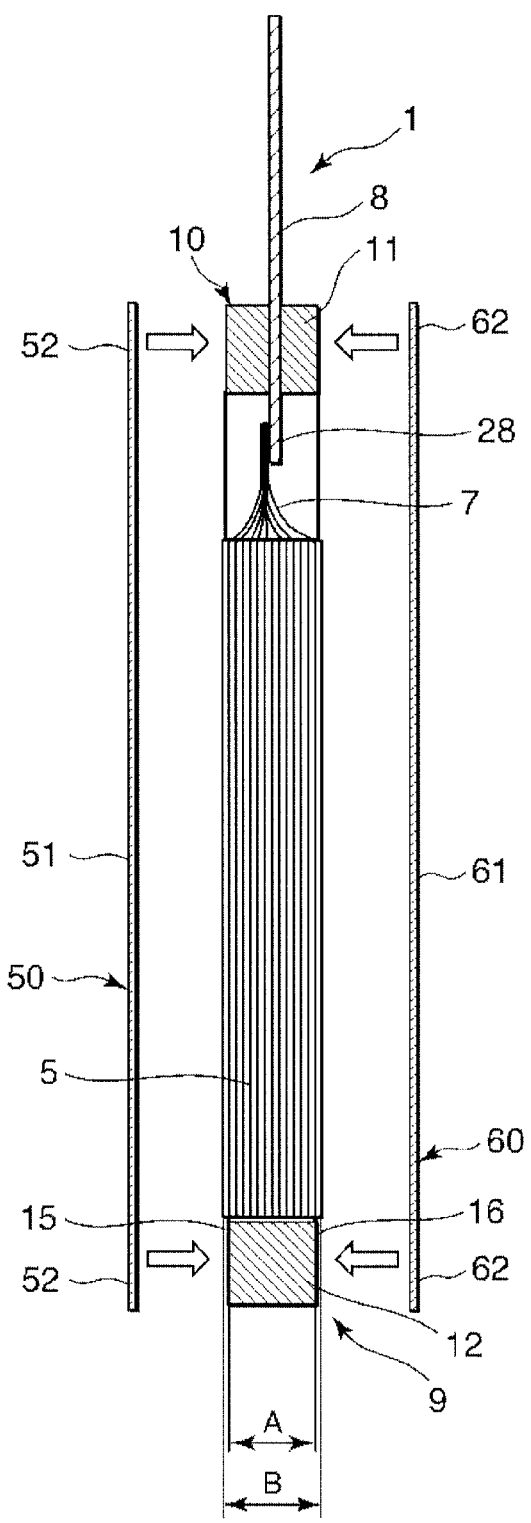
FIG. 3 is an exploded longitudinal sectional view of the electric double layer capacitor cell.

Referring to FIG. 3, in the laminate film adhesion process, the adhesion portions 52 and 62 are adhered to sites of the outer shell body 10 corresponding to the end surface 15 and the end surface 16 of the upper side portion 11, the lower side portion 12, the right side portion 13, and the left side portion 14.

The laminate film adhesion process is performed using a heater. The laminate film piece 50 and the laminate film piece 60 are respectively overlapped with the outer shell body 10, whereupon the overlapping parts are pressed and then heated by heat transfer from the heater. As a result, the resin on the front surfaces of the laminate film pieces 50 and 60 and the resin material of the outer shell body 10 melt. The molten resin is then cooled and hardened. The adhesion portions 52 and 62 are thus adhered without gaps to the sites corresponding to the end surface 15 and the end surface 16 of the upper side portion 11, the lower side portion 12, the right side portion 13, and the left side portion 14, and as a result, a favorable sealing performance is secured in the case 9.

The heater includes an electric heater, for example, and heats the laminate film pieces 50 and 60 with heat generated by the electric heater. The heater may be provided with a high frequency induction heating apparatus, or in other words a so-called IH apparatus, that heats the aluminum intermediate layer of the laminate film piece 60 through electromagnetic induction.

After adhering the laminate film pieces 50 and 60 in this manner, the laminated body 5 is housed in the storage chamber 49 inside the case 9.

(2) Electrolyte Charging Process

The electrolyte charging process is performed by injecting the electrolyte into the case 9 through a charging hole formed in the case 9 housing the laminated body 5 and then allowing air in the case 9 to flow out through the pressure purge valve 70, for example. The charging hole in the case 9 is sealed by a plug after the electrolyte is charged.

Following the electrolyte charging process, the case 9 is filled with the electrolyte, and assembly of the capacitor cell 1 is thereby completed.

Figure 4:
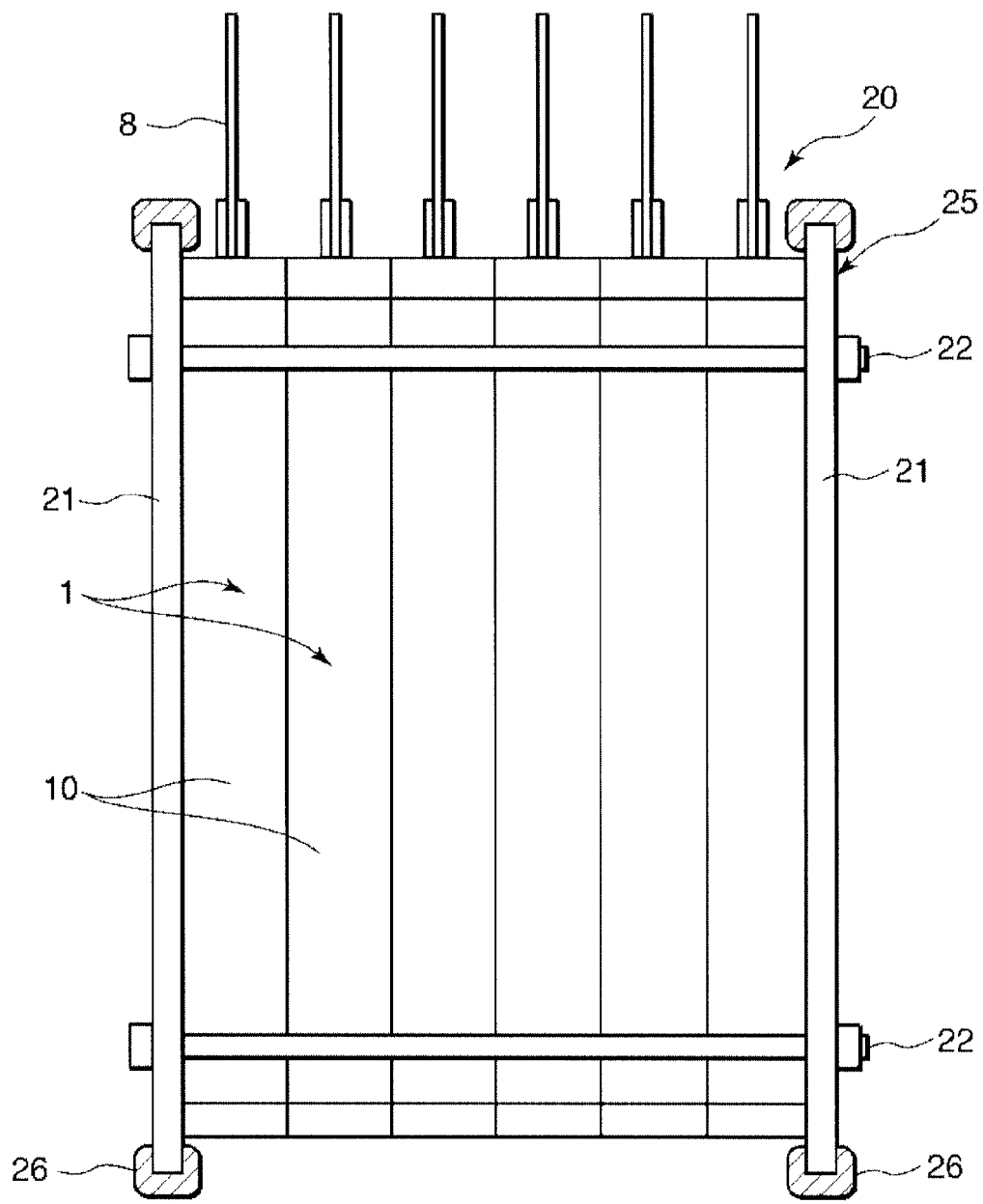
FIG. 4 is an elevation view of a capacitor module according to this invention.
Figure 5:
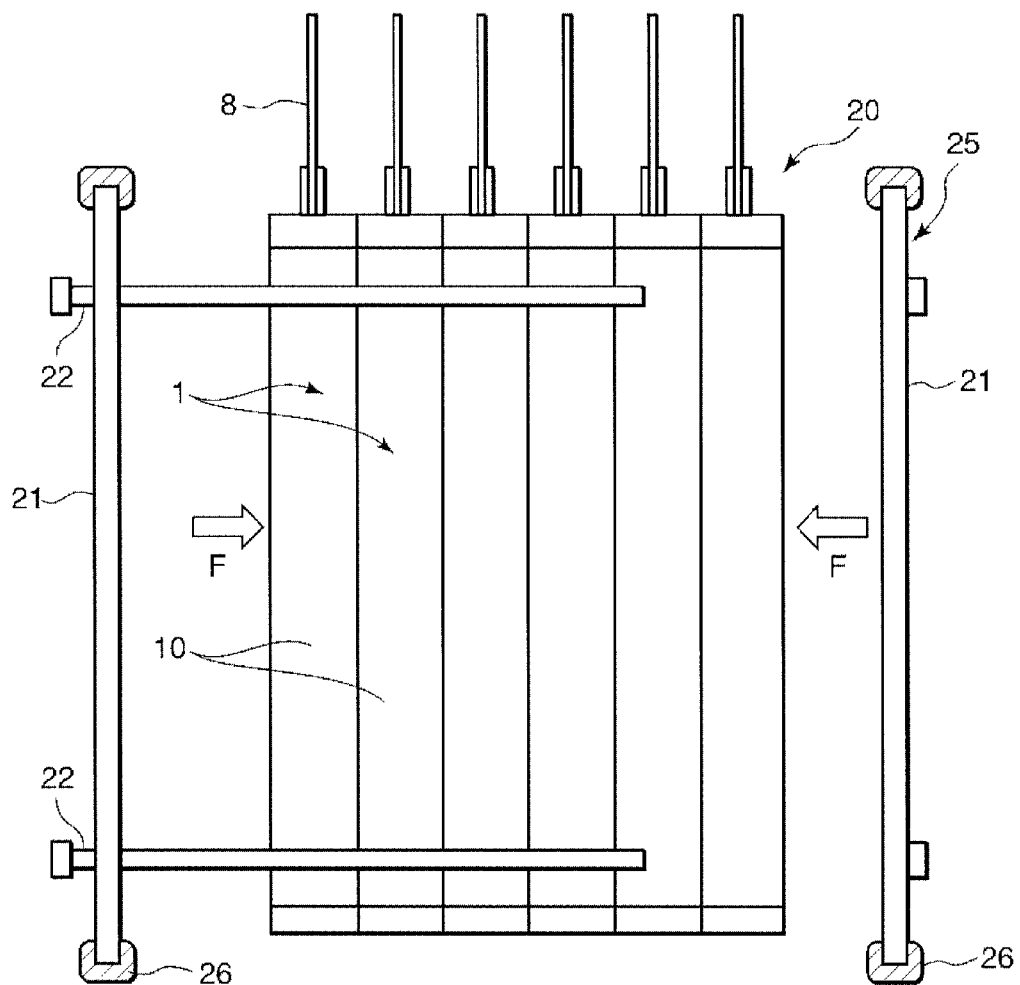
FIG. 5 is an exploded elevation view of the capacitor module.
Figure 6:
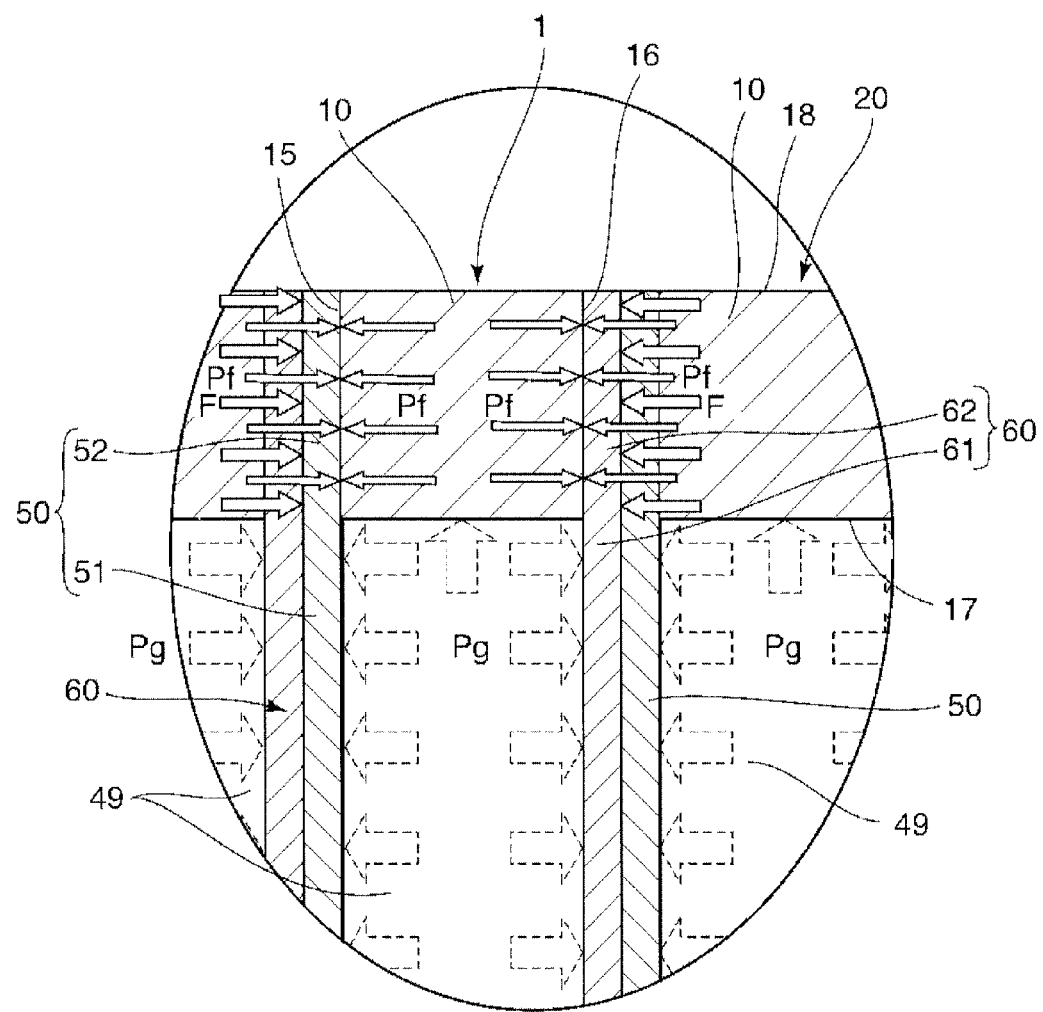
FIG. 6 is an enlarged longitudinal sectional view showing main parts of the capacitor module.

Referring to FIGS. 4-6, a capacitor module 20 serving as a storage device is formed from a plurality of the capacitor cells 1 assembled in the manner described above.

The capacitor module 20 includes a laminated cell formed by laminating a plurality of the capacitor cells 1 in the lamination direction of the laminated body 5, and a pressure holder 25 that presses the laminated cell in the lamination direction. The pressure holder 25 holds the plurality of capacitor cells 1 to prevent the capacitor cells 1 from shifting relative to each other due to vibration or an impact.

The pressure holder 25 includes a pair of pressure plates 21 sandwiching the capacitor module 20, and a plurality of penetrating bolts 22 penetrating the pair of pressure plates 21 and the capacitor cells 1 therebetween. Nuts are fastened to projecting ends of the penetrating bolts 22.

When the pair of pressure plates 21 are tightened by the penetrating bolts 22 and the nuts, a load F is exerted on the pressure plates 21, as shown by an arrow in FIG. 5, and as a result of the load F, a lamination direction compressive force is applied to the capacitor cells 1 sandwiched between the pressure plates 21.

In this embodiment, four penetrating bolts 22 penetrate the four corners of the respective capacitor cells 1, but the number of penetrating bolts 22 is not limited to four and may be increased or reduced in accordance with a tightening force required of the pressure holder 25. Further, a constitution in which the capacitor cells 1 are compressed using a spring, for example, may be applied as the pressure holder 25.

A damping member 26 formed from an elastic material is attached to an outer periphery of the pressure plate 21. The damping member 26 is formed with a C shaped cross-section so that it can be fitted to the outer periphery of the pressure plate 21 from the outside. The capacitor module 20 is housed in a casing. The damping member 26 is interposed between the capacitor module 20 and the casing in order to absorb vibration and impacts transmitted to the capacitor module 20 from the casing.

The compressive load F applied by the pressure holder 25 causes the laminate film pieces 50 and 60 of adjacent capacitor cells 1 to contact each other over their entire surfaces without gaps. As shown by broken line arrows in FIG. 6, a surface pressure Pf based on the compressive load F is transmitted to the adhesion portions 52 and 62 of the laminate film pieces 50 and 60 from the outer shell body 10, and the adhesion portions 52 and 62 are respectively pressed against the end surfaces 15 and 16 of the outer shell body 10 by the surface pressure Pf, thereby preventing the adhesion portions 52 and 62 from peeling away from the outer shell body 10. The compressive load F is necessary in order to maintain the sealing performance of the case 9 when an adhesive force of an adhered portion between the respective adhesion portions 52 and 62 and the outer shell body 10 decreases.

The laminate film pieces 50 and 60 are sandwiched between adjacent outer shell bodies 10 by the compressive load F generated by the pressure plates 21 and therefore have substantially no sites that are exposed to the outside. This is favorable for suppressing temporal deterioration of the laminate film pieces 50 and 60.

As shown by arrows in FIG. 6, an internal gas pressure Pg of the capacitor cell 1 acts on the film portions 51 and 61 of the laminate film pieces 50 and 60 and the inner peripheral surface 17 of the outer shell body 10. Here, adjacent film portions 51 and 61 contact each other, and therefore the film portions 51 and 61 are not deformed by the gas pressure Pg. As a result, excessive stress is not generated in the film portions 51 and 61 of the laminate film pieces 50 and 60.

Further, the internal gas pressure Pg of the capacitor cell 1 is suppressed to or below a predetermined pressure by having the pressure purge valve 70 purge the gas generated in the capacitor cell 1 to the outside.

Referring back to FIG. 3, a lamination direction width B of the laminated body 5 when the capacitor cell 1 is in a free state is set to be larger than a lamination direction width A of the outer shell body 10 by a predetermined ratio.

The capacitor cells 1 forming the capacitor module 20 are compressed by the pressure holder 25 to a predetermined compression amount (B-A) in the lamination direction, or in other words until the lamination direction width of the laminated body 5 becomes equal to the lamination direction width A of the outer shell body 10. By compressing the positive electrode bodies 2 and negative electrode bodies 3 forming the laminated body 5 appropriately in this manner, an internal resistance of the capacitor cell 1 is reduced.

The compression amount (B-A) is set at 0.1 mm to 0.3 mm, for example. When the capacitor cell 1 is in a free state, the laminate film pieces 50 and 60 are pressed by the laminated body 5 so as to bulge out. However, the bulge is only 0.1 mm to 0.3 mm, and therefore excessive stress is not generated in the laminate film pieces 50 and 60.

When the compression amount (B-A) is set at a larger value, contact portions of the laminate film pieces 50 and 60 contacting the laminated body 5 may be formed with a bulge in advance during the pressing process.

The outer peripheral surface 18 of the outer shell body 10 and outer edge portions of the laminate film pieces 50 and 60 are exposed to the outside when laminated to form the capacitor module 20. Therefore, heat generated in the capacitor cell 1 is released into outside air via the outer peripheral surface 18 and the laminate film pieces 50 and 60.

The capacitor cell 1 generates a much smaller amount of heat than an accumulator employing a chemical reaction even when structured such that the heat generating laminated body 5 is housed in the resin outer shell body 10. Accordingly, a sufficient cooling performance can be secured in the laminated body 5.

As described above, in the case 9 according to this invention, the storage chamber 49 is defined when the laminate film pieces 50 and 60 are adhered to the outer shell body 10. Therefore, in comparison with the case described above in the prior art, where the case is formed by press-molding laminate film pieces three-dimensionally, variation in the thickness and density of the laminate film pieces and residual stress are reduced. As a result, the case 9 does not suffer a reduction in durability brought about by these factors. By improving the durability in this manner, electrolyte leakage to the outside of the case 9 is prevented completely over the long term.

The case 9 has a self-standing structure provided by the outer shell body 10. Therefore, in contrast to the case described above in the prior art, where the case is formed by adhering laminate film pieces into a bag shape, there is no need to reinforce individual cases using a frame, and as a result, the number of components of the capacitor cell 1 can be reduced.

In the capacitor module 20 according to this invention, the capacitor cells 1 are laminated such that the film portion 51 of the laminate film piece 50 and the film portion 61 of the laminate film piece 60 contact each other fully. As a result, deformation of the film portions 51 and 61 due to the internal gas pressure Pg of the case 9 is canceled out, and therefore excessive stress is not generated in the film portions 51 and 61. Further, since the film portions 51 and 61 contact each other fully, a differential pressure between the interior and the exterior of the storage chamber 49 does not act on the film portion 51 and the film portion 61, and therefore the capacitor module 20 can be provided with superior durability.

In the capacitor module 20 according to this invention, the adhesion portion 52 of the laminate film piece 50 and the adhesion portion 62 of the laminate film piece 60 are respectively pressed against the outer shell body 10 by the compressive load F of the pressure holder 25. Therefore, the adhesion portion 52 or 62 does not peel away from the outer shell body 10 even when the adhesive force of the adhesion portion 52 or 62 on the outer shell body 10 decreases, and as a result, a favorable sealing performance can be maintained in the case 9. Hence, electrolyte leakage to the outside of the case 9 can be prevented completely over the long term.

In the capacitor module 20 according to this invention, the pressure holder 25 compresses the laminated body 5, and therefore the internal resistance of the capacitor cell 1 can be reduced, enabling an increase in an output of the capacitor module 20. Further, a favorable effect is obtained in preventing deterioration of the capacitor module 20 relative to the capacitance and the internal resistance.

Figure 7:
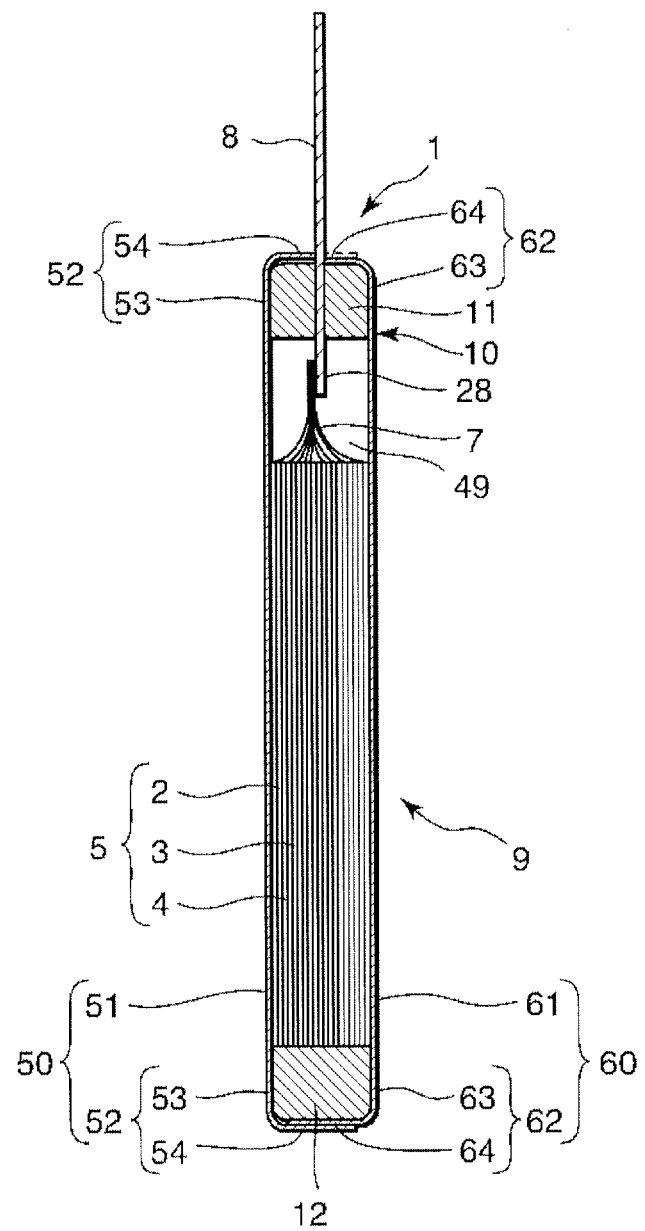
FIG. 7 is a longitudinal sectional view of an electric double layer capacitor cell according to a second embodiment of this invention.
Figure 8:
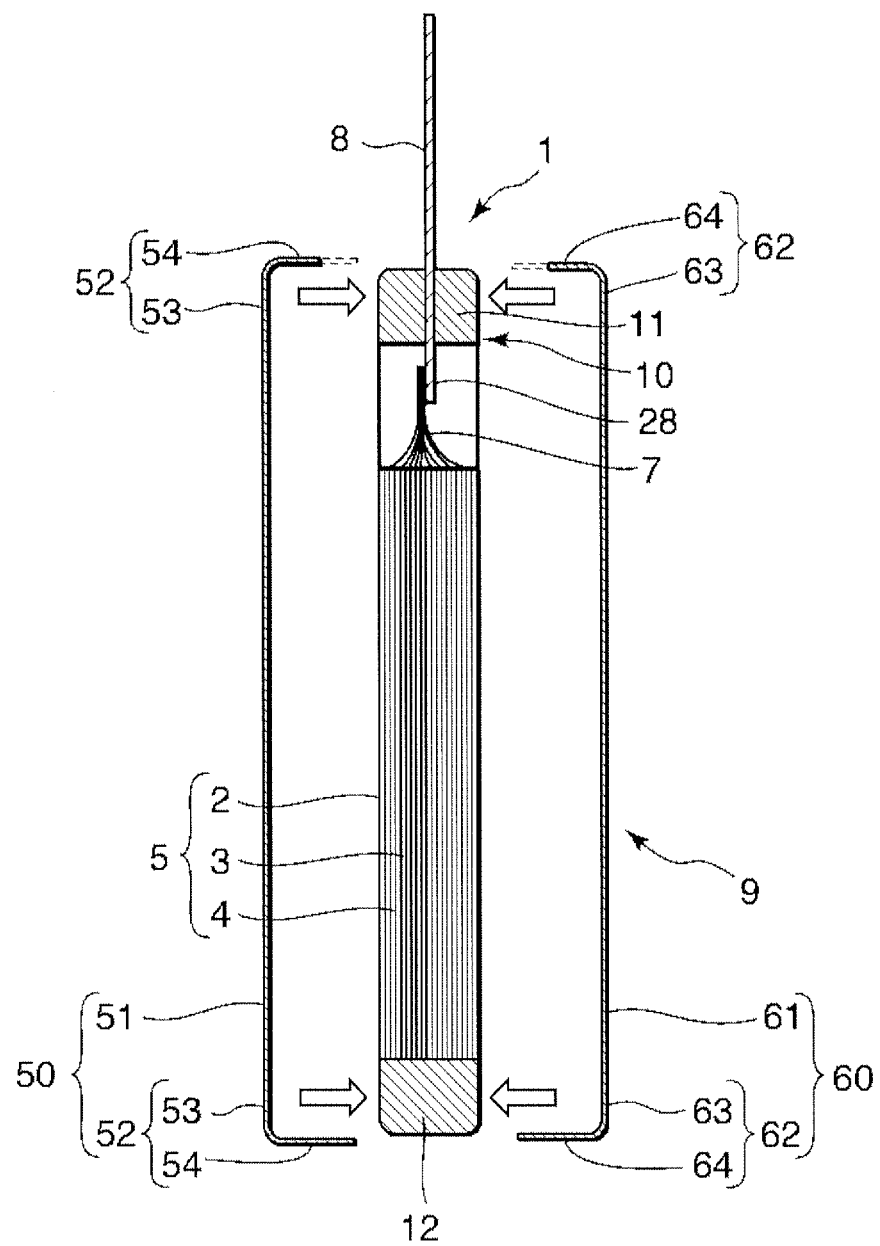
FIG. 8 is an exploded longitudinal sectional view of the electric double layer capacitor cell according to the second embodiment of this invention.
Figure 9:
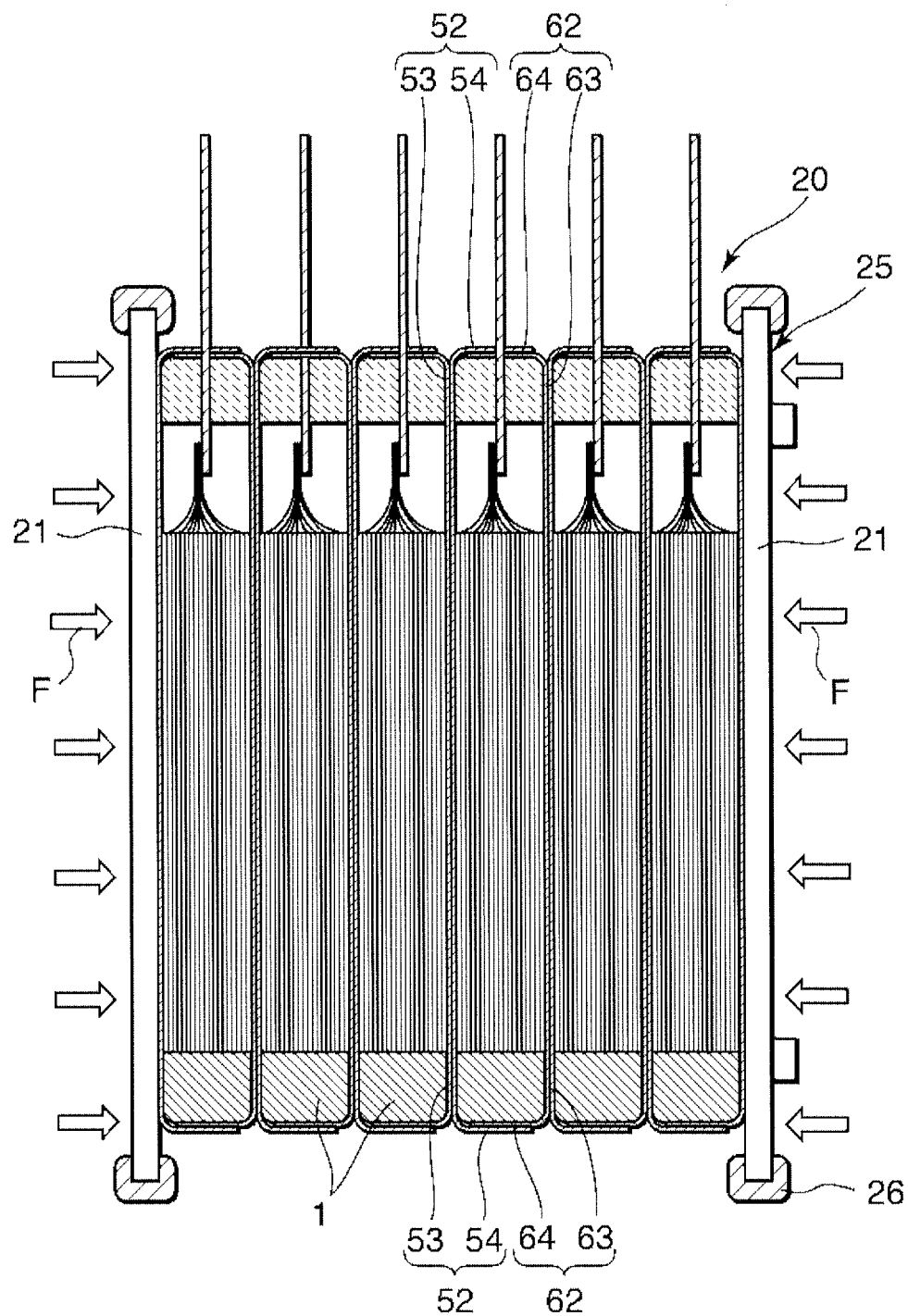
FIG. 9 is a longitudinal sectional view of a capacitor module according to the second embodiment of this invention.

Referring to FIGS. 7-9, a second embodiment of this invention will be described.

Identical constitutional parts to the first embodiment have been allocated identical numerals, and description thereof has been omitted.

In this embodiment, the laminate film pieces 50 and 60 are molded into a plate shape in advance by implementing three-dimensional pressing on a base material.

The adhesion portion 52 of the laminate film piece 50 includes an inside adhesion portion 53 positioned on an extension of the film portion 51 and an outside adhesion portion 54 bent by substantially ninety degrees on the outside of the inside adhesion portion 53. The adhesion portion 62 of the laminate film piece 60 includes an inside adhesion portion 63 positioned on an extension of the film portion 61 and an outside adhesion portion 64 bent by substantially ninety degrees on the outside of the inside adhesion portion 63.

The outside adhesion portions 54 and 64 are shaped to surround the outer peripheral surface 18 of the outer shell body 10. As shown in FIG. 8, the laminate film pieces 50 and 60 are attached from either side of the lamination direction such that the outside adhesion portions 54 and 64 cover the outer peripheral surface 18 of the outer shell body 10. The outside adhesion portion 64 is then adhered to the outer peripheral surface 18. Further, the outside adhesion portion 54 is overlapped with the outside adhesion portion 64 and then adhered thereto. Furthermore, the inside adhesion portion 53 and the inside adhesion portion 63 are adhered to the end surface 15 and the end surface 16, respectively.

As regards the electrode terminal 8, sites of the outside adhesion portions 54 and 64 corresponding to the electrode terminal 8 are cut out in a rectangular shape. Alternatively, slits are formed in advance in positions of the outside adhesion portions 54 and 64 corresponding to the electrode terminal 8, and the laminate film pieces 50 and 60 are placed over the outer shell body 10 after inserting the electrode terminal 8 through the slits.

The outside adhesion portions 54 and 64 may be adhered to the outer peripheral surface 18 so as to cover approximately half of the width of the outer peripheral surface 18 each, rather than being overlapped.

By employing the outer peripheral surface 18 of the outer shell body 10 as an adhesion surface of the laminate film pieces 50 and 60 in this manner, a sufficient adhesion surface area can be secured on the outer shell body 10 without increasing dimensions of the outer shell body 10.

Figure 10:
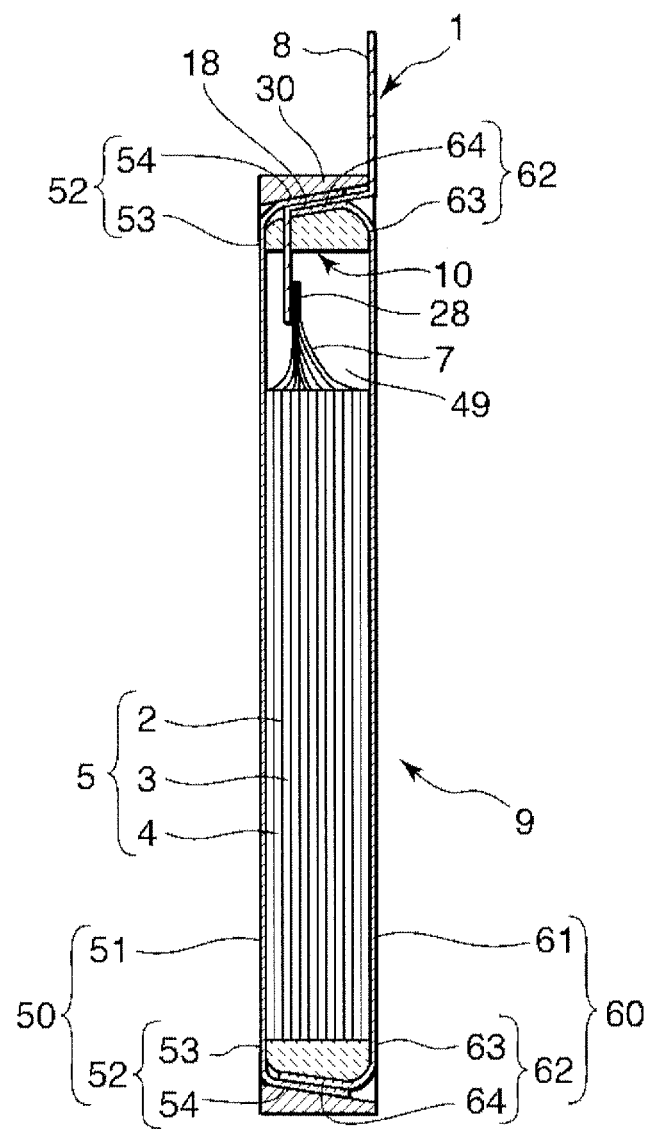
FIG. 10 is a longitudinal sectional view of an electric double layer capacitor cell according to a third embodiment of this invention.
Figure 11:
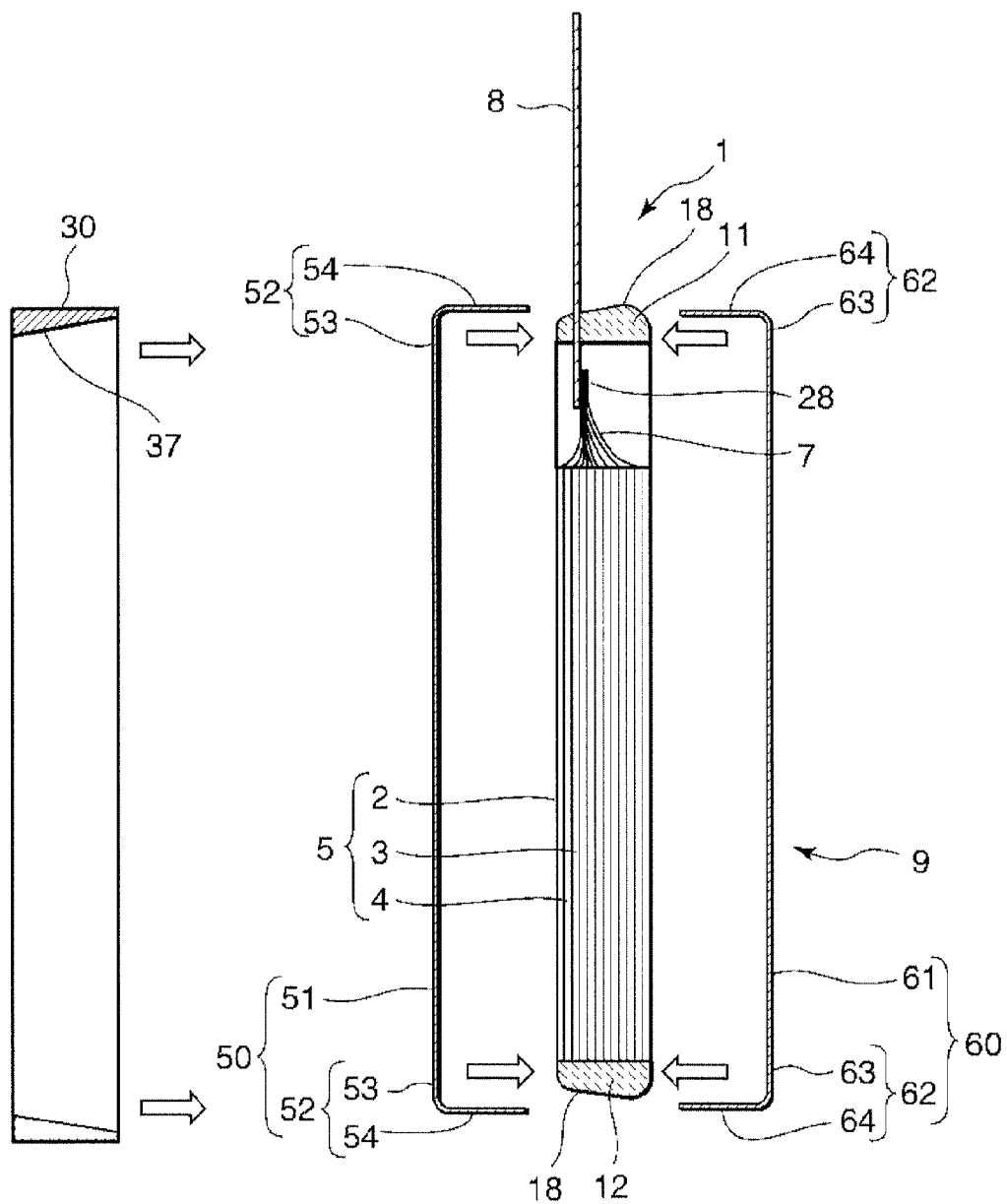
FIG. 11 is an exploded longitudinal sectional view of the electric double layer capacitor cell according to the third embodiment of this invention.
Figure 12:
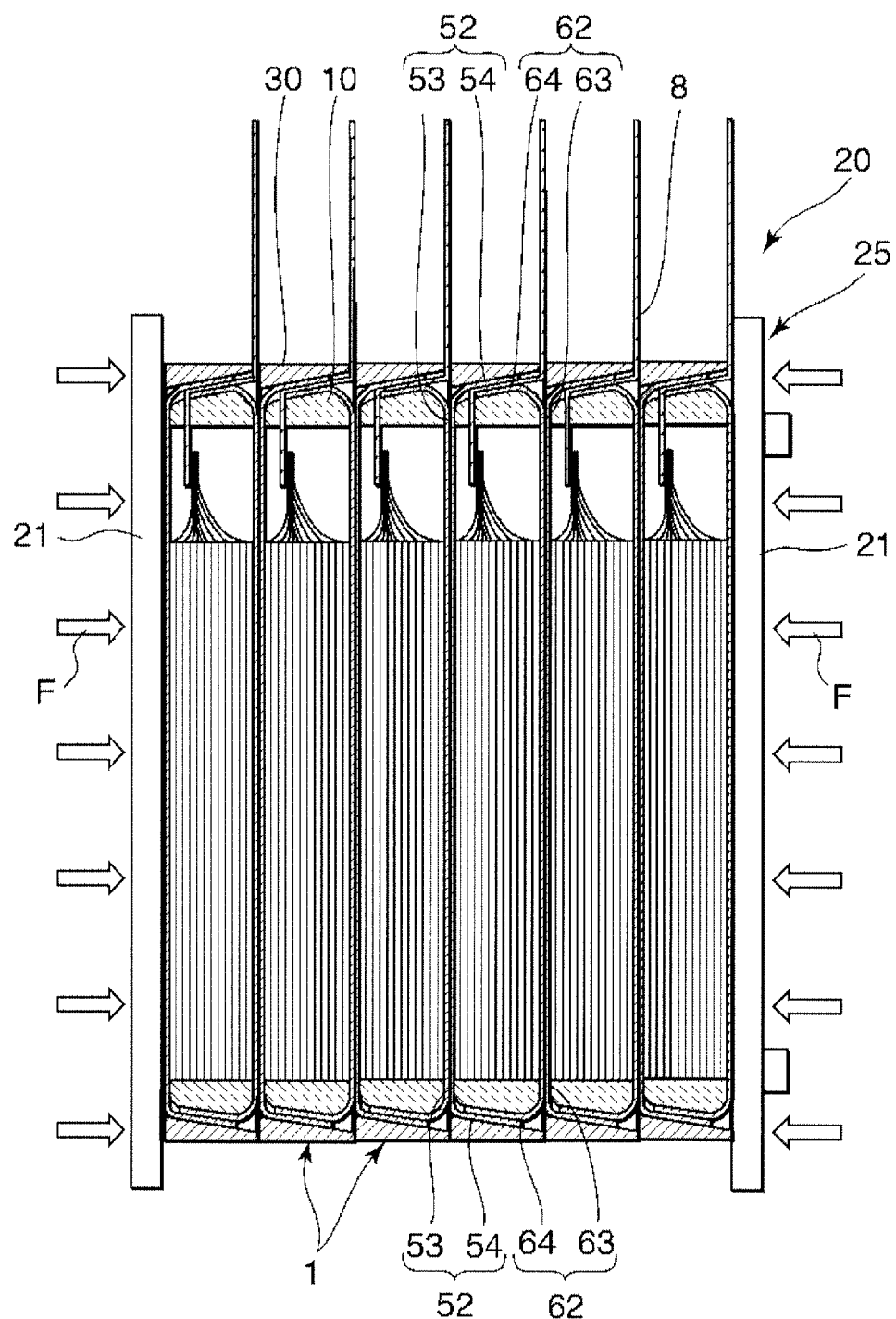
FIG. 12 is a longitudinal sectional view of a capacitor module according to the third embodiment of this invention.

Referring to FIGS. 10-12, a third embodiment of this invention will be described.

In this embodiment, a frame body 30 is attached to the outer periphery of the capacitor cell 1 according to the second embodiment. Identical constitutional parts to the second embodiment have been allocated identical numerals, and description thereof has been omitted.

In this embodiment, the outer peripheral surface 18 of the outer shell body 10 forms a tapered surface that is inclined on a wedge relative to the lamination direction of the capacitor cell 1. An inner peripheral surface 37 of the frame body 30 likewise forms a tapered surface.

As shown in FIG. 10, the electrode terminal 8 projecting from the outer shell body 10 is bent on the outside of the outer shell body 10, passes between the outer peripheral surface 18 of the outer shell body 10 and the inner peripheral surface 37 of the frame body 30 until it reaches the outside of the frame body 30, and is then bent upward.

The process for adhering the laminate film pieces 50 and 60 to the outer shell body 10 is performed in a following sequence.

(1) The outside adhesion portion 64 of the laminate film piece 60 is placed over the outer peripheral surface 18 of the outer shell body 10.

(2) The electrode terminal 8 is bent as shown in FIG. 10, whereupon the outside adhesion portion 54 of the laminate film piece 50 is placed over the outside adhesion portion 64 and the bent electrode terminal 8.

(3) The frame body 30 is fitted to an outer periphery of the outside adhesion portion 54. The inner peripheral surface 37 of the frame body 30 and the outer peripheral surface 18 of the outer shell body 10 both form tapered surfaces, and therefore the frame body 30 and outer shell body 10 are fitted together in a wedge shape via these tapered surfaces. As a result, a compressive force acts on the outside adhesion portions 54 and 64 such that the outside adhesion portions 54 and 64 come into close contact. The electrode terminal 8 is passed between the outside adhesion portion 54 and the outside adhesion portion 64 to the outside of the frame body 30.

(4) Using a high frequency induction heating apparatus, or in other words a so-called IH apparatus, the aluminum intermediate layers of the outside adhesion portions 54 and 64 are heated. As a result, the outside adhesion portions 54 and 64 are adhered to each other. Moreover, the outside adhesion portion 54 is adhered to the frame body 30 and the outside adhesion portion 64 is adhered to the outer shell body 10.

Likewise in this embodiment, similarly to the second embodiment, the outer peripheral surface 18 of the outer shell body 10 is employed as the adhesion surface of the laminate film pieces 50 and 60, and therefore a sufficient adhesion surface area can be secured on the outer shell body 10 without increasing the dimensions of the outer shell body 10. Further, in this embodiment, the inner peripheral surface 37 of the frame body 30 and the outer peripheral surface 18 of the outer shell body 10 both form tapered surfaces, and therefore a compressive force acts on the outside adhesion portions 54 and 64, enabling an increase in the adhesive force of the outside adhesion portions 54 and 64. As a result, a further improvement can be achieved in the durability of the case 9 housing the storage unit.

Furthermore, in this embodiment, the frame body 30 is attached to the outer periphery of the outer shell body 10 to which the laminate film pieces 50 and 60 are adhered, and therefore the rigidity of the capacitor cell 1 can be increased.

In the capacitor module 20 using the capacitor cells 1 according to this embodiment, similarly to the first and second embodiments, the film portion 51 of the laminate film piece 50 and the film portion 61 of the laminate film piece 60 contact each other fully. Moreover, adjacent frame bodies 30 contact each other. As a result, the capacitor cell 1 is prevented from shifting relative to the frame body 30, and therefore a fastening force exerted on the outside adhesion portions 54 and 64 of the laminate film pieces 50 and 60 by the frame body 30 is maintained permanently. Hence, the capacitor module 20 can be provided with superior durability.

The contents of Tokugan 2008-332797, with a filing date of Dec. 26, 2008 in Japan, are hereby incorporated by reference.

Although the invention has been described above with reference to certain embodiments, the invention is not limited to the embodiments described above. Modifications and variations of the embodiments described above will occur to those skilled in the art, within the scope of the claims.

For example, the above embodiments are applied to an electric double layer capacitor cell, but this invention may be applied to any storage body and storage device having a case that is formed from laminate film pieces housing the storage unit.

INDUSTRIAL APPLICABILITY

As described above, the storage body and storage device according to this invention are useful for improving the durability of a storage body and a storage device for installation in a vehicle. However, the scope of application of the storage body and storage device according to this invention is not limited thereto.

The embodiments of this invention in which an exclusive property or privilege is claimed are defined as follows:

1. A storage body, comprising:
    a storage unit that stores electric energy; and
    a case that houses the storage unit,
    wherein the case comprises:
    a frame-shaped outer shell body having an outer peripheral surface and two end surfaces that respectively include opening portions; and
    a pair of laminate film pieces that are constituted by flexible laminated sheets and adhered to the two end surfaces of the outer shell body so as to form a storage chamber inside the outer shell body, and
    each of the laminate film pieces comprises:
    an adhesion portion that is adhered to the outer shell body; and
    a film portion that faces the storage chamber,
    wherein one of the pair of the laminate film pieces has a first outside adhesion portion of which an entire surface is adhered to the outer peripheral surface while another of the pair of the laminate film pieces has a second outside adhesion portion that is adhered to the first outside adhesion portion such that the first outside adhesion portion is disposed between the second outside adhesion portion and the outer peripheral surface.

2. The storage body as defined in claim 1, further comprising a frame body that is fitted to an outer peripheral surface of the second outside adhesion portion, and
    a contact surface of the outer shell body to the first outside adhesion portion and a fitting surface of the frame body to the second outside adhesion portion are both formed as tapered surfaces.

3. The storage body as defined in claim 1, further comprising an electrode terminal that is connected to the storage unit and projects to an outside of the outer shell body.

4. The storage body as defined in claim 1, wherein the storage unit is constituted by a laminated body formed by laminating a positive electrode body and a negative electrode body via a separator over a plurality of layers, and an electrolyte that wets the laminated body.

5. The storage body as defined in claim 1, wherein the storage body is constituted by an electric double layer capacitor cell.

6. A storage device formed by laminating a plurality of storage bodies, wherein each of the storage bodies comprises:
    a storage unit that stores electric energy; and
    a case that houses the storage unit,
    the case comprises:
    a frame-shaped outer shell body having an outer peripheral surface and two end surfaces that respectively include opening portions; and
    a pair of laminate film pieces that are constituted by flexible laminated sheets and adhered to the two end surfaces of the outer shell body so as to form a storage chamber inside the outer shell body, and
    each of the laminate film pieces comprises:
    an adhesion portion that is adhered to the outer shell body; and
    a film portion that faces the storage chamber,
    wherein one of the pair of the laminate film pieces has a first outside adhesion portion of which an entire surface is adhered to the outer peripheral surface while another of the pair of the laminate film pieces has a second outside adhesion portion that is adhered to the first outside adhesion portion such that the first outside adhesion portion is disposed between the second outside adhesion portion and the outer peripheral surface.

7. The storage device as defined in claim 6, wherein the film portions of two adjacent storage bodies of the storage bodies contact each other.

8. The storage device as defined in claim 6, further comprising a pressure holder that presses the laminated storage bodies in a lamination direction.

9. The storage device as defined in claim 8, wherein each of the storage bodies is constituted by an electric double layer capacitor cell in which the storage unit, which is constituted by a laminated body formed by laminating a positive electrode body and a negative electrode body via a separator over a plurality of layers and an electrolyte that wets the laminated body, is housed in the case,
    for each of the storage bodies a lamination direction width of the laminated body in a free state is greater than a lamination direction width of the outer shell body, and the pressure holder compresses the laminated body such that the lamination direction width of the laminated body becomes equal to the lamination direction width of the outer shell body.

10. The storage device as defined in claim 8, wherein each of the storage units is an electric double layer capacitor cell comprising:
    a laminated body comprising:
    positive electrode bodies;

negative electrode bodies;
separators between the positive electrode bodies and the negative electrode bodies,
wherein the positive electrode bodies and the negative electrode bodies are laminated via the separators to form a plurality of layers each including one of the positive electrode bodies, one of the negative electrode bodies and one of the separators; and
an electrolyte, that wets the laminated body, housed in the case that stores the storage unit,
wherein a lamination direction width of the laminated body in a free state is greater than a lamination direction width of the outer shell body, and
further wherein the pressure holder compresses the laminated body such that the lamination direction width of the laminated body becomes equal to the lamination direction width of the outer shell body.

11. The storage device as defined in claim 6, wherein for each storage body, the first outside adhesion portion includes resin which adheres to the outer shell body and the second outside adhesion portion includes resin which adheres to the first outside adhesion portion.

12. The storage body as defined in claim 1, wherein the first outside adhesion portion includes resin which adheres to the outer shell body and the second outside adhesion portion includes resin which adheres to the first outside adhesion portion.

13. The storage body as defined in claim 1, wherein the storage unit is an electric double layer capacitor cell constituted by a laminated body comprising:
positive electrode bodies;
negative electrode bodies; and
separators between the positive electrode bodies and the negative electrode bodies,
wherein the positive electrode bodies and the negative electrode bodies are laminated via the separators to form a plurality of layers each including one of the positive electrode bodies, one of the negative electrode bodies and one of the separators.

14. The storage body as defined in claim 1, wherein the first outside adhesion portion and the second outside adhesion portion are parallel to each other.

15. The storage device as defined in claim 6, wherein the first outside adhesion portion and the second outside adhesion portion are parallel to each other.

* * * * *